(12) United States Patent
Perkins

(10) Patent No.: US 10,369,865 B2
(45) Date of Patent: *Aug. 6, 2019

(54) DIRECTIONAL CLIMATE CONTROL SYSTEM WITH INFRARED TARGETING

(71) Applicant: FORD GLOBAL TECHNOLOGIES, LLC, Dearborn, MI (US)

(72) Inventor: William Paul Perkins, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 89 days.

This patent is subject to a terminal disclaimer.

(21) Appl. No.: 15/831,486

(22) Filed: Dec. 5, 2017

(65) Prior Publication Data

US 2018/0093546 A1  Apr. 5, 2018

Related U.S. Application Data

(62) Division of application No. 14/492,637, filed on Sep. 22, 2014, now Pat. No. 9,862,247.

(51) Int. Cl.
*B60H 1/00* (2006.01)

(52) U.S. Cl.
CPC ..... *B60H 1/00742* (2013.01); *B60H 1/00871* (2013.01)

(58) Field of Classification Search
CPC ........................ B60H 1/00742; B60H 1/00871
USPC ................................ 165/112, 202, 203, 204
See application file for complete search history.

(56) References Cited

U.S. PATENT DOCUMENTS

| | | |
|---|---|---|
| 5,187,943 A | 2/1993 | Taniguchi et al. |
| 5,518,176 A | 5/1996 | Turner et al. |
| 5,531,377 A | 7/1996 | Thayer et al. |
| 5,579,994 A | 12/1996 | Davis, Jr. et al. |
| 6,659,360 B1 | 12/2003 | Schaefer et al. |
| 7,246,656 B2 | 7/2007 | Ichishi et al. |
| 7,578,341 B2 | 8/2009 | Ichishi et al. |
| 8,280,584 B2 | 10/2012 | Mikat |
| 9,074,785 B2 | 7/2015 | Strelec et al. |
| 9,150,132 B2 | 10/2015 | Hoke et al. |
| 9,189,897 B1 | 11/2015 | Stenneth |
| 9,323,725 B2 | 4/2016 | Kahle |
| 9,417,638 B2 | 8/2016 | Cheng et al. |

(Continued)

FOREIGN PATENT DOCUMENTS

JP         06106952        4/1994

*Primary Examiner* — Joel Attey
(74) *Attorney, Agent, or Firm* — Vichit Chea; MacMillan, Sobanski & Todd, LLC

(57) ABSTRACT

A heating, ventilating, and air conditioning (HVAC) system has a steerable outlet for directing a stream of treated air into a passenger compartment of a vehicle. A thermographic imager is configured to capture thermographic images covering a fixed region within the passenger compartment in which an occupant is potentially located. The HVAC control circuit is configured to a) compress a thermographic image to a temperature map representing pixels of the thermographic image falling within a predetermined temperature range corresponding to the occupant, b) filter the temperature map according to a sliding window to coalesce continuous regions of pixels on average falling within the predetermined temperature range, c) quantify an area for each continuous region, d) locate a centroid of a continuous region having a largest area, and e) aim the steerable outlet toward the centroid.

6 Claims, 7 Drawing Sheets

(56) References Cited

U.S. PATENT DOCUMENTS

| | | |
|---|---|---|
| 9,628,565 B2 | 4/2017 | Stenneth et al. |
| 2002/0110178 A1 | 8/2002 | Puranen et al. |
| 2003/0157881 A1 | 8/2003 | Goupil, Jr. et al. |
| 2008/0105754 A1 | 5/2008 | Baruschke et al. |
| 2012/0142264 A1 | 6/2012 | Sagou et al. |
| 2013/0255930 A1 | 10/2013 | Prakah-Asante et al. |
| 2014/0120819 A1 | 5/2014 | Stakutis et al. |
| 2015/0094914 A1 | 4/2015 | Abreu |
| 2016/0082808 A1 | 3/2016 | Perkins |
| 2016/0195856 A1 | 7/2016 | Spero |
| 2016/0363340 A1 | 12/2016 | Shikii et al. |

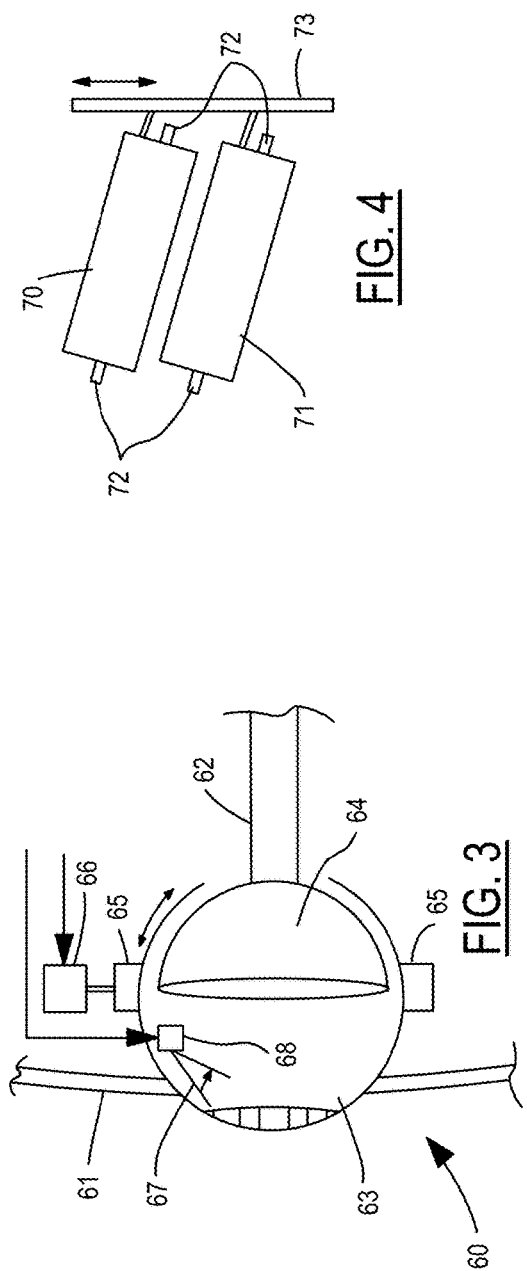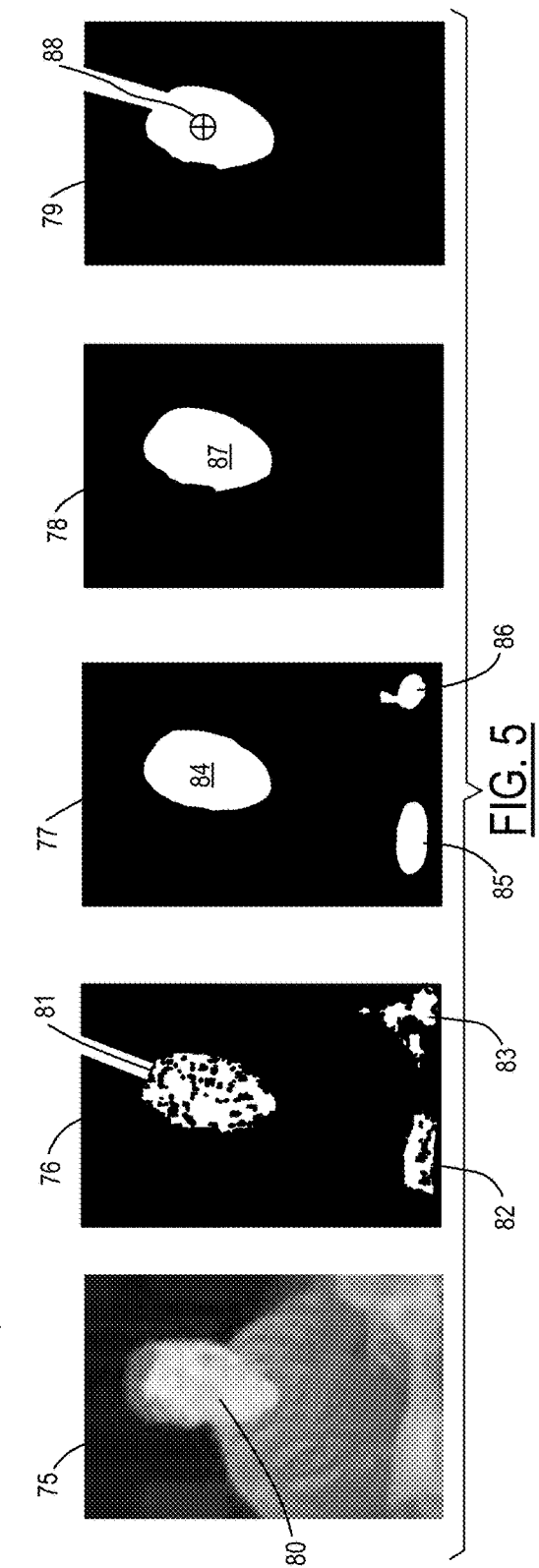

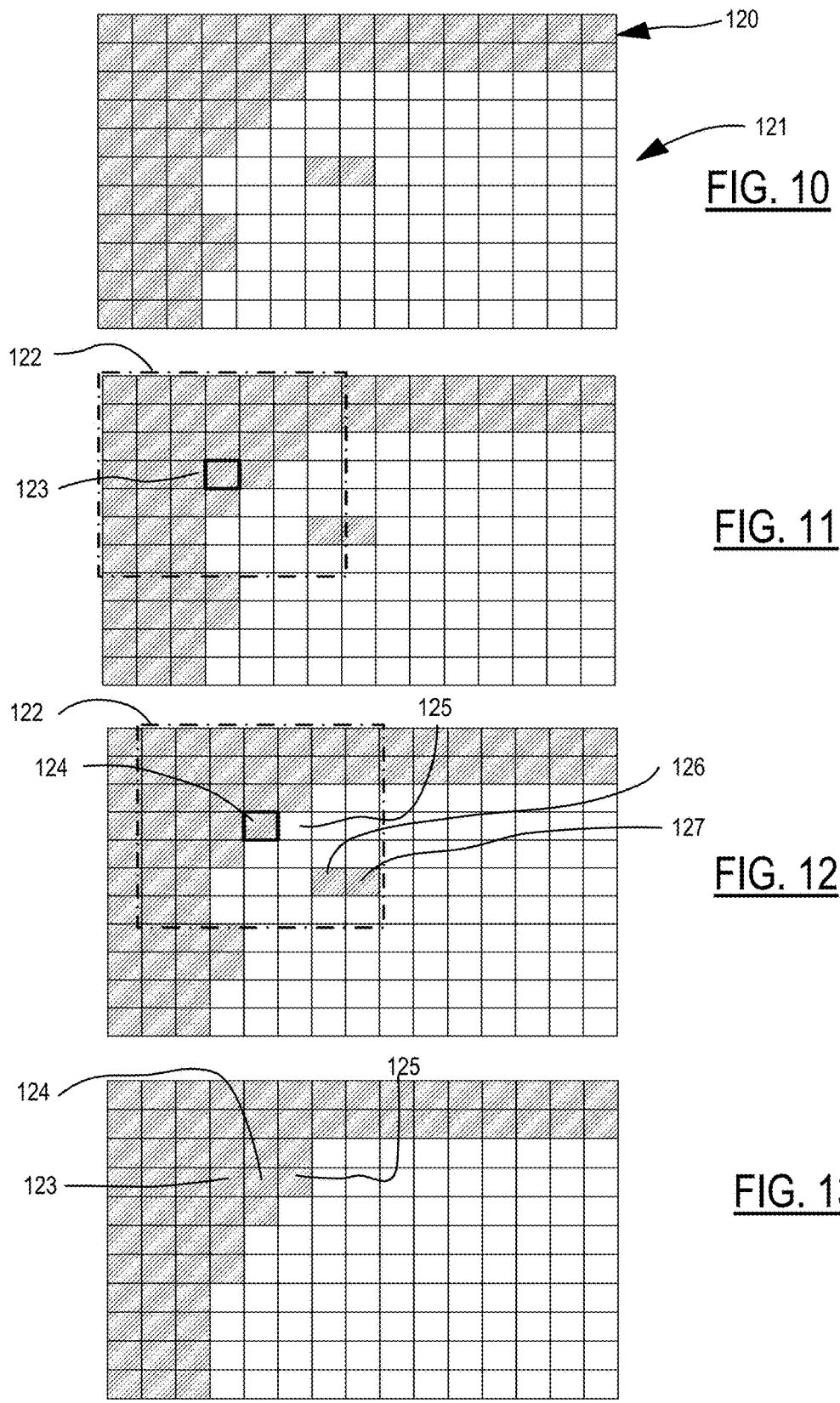

DIRECTIONAL CLIMATE CONTROL SYSTEM WITH INFRARED TARGETING

CROSS REFERENCE TO RELATED APPLICATIONS

This application is a division of co-pending U.S. application Ser. No. 14/492,637, filed Sep. 22, 2014, which is incorporated herein by reference.

STATEMENT REGARDING FEDERALLY SPONSORED RESEARCH

Not Applicable.

BACKGROUND OF THE INVENTION

The present invention relates in general to automotive HVAC systems, and, more specifically, to automatic adjustment of steerable air outlets to direct treated air to optimize passenger comfort and reduce energy usage.

Heating, ventilating, and air conditioning (HVAC) systems control the climate in transportation vehicles such as automobiles in order to maintain thermal comfort of the vehicle occupants. Typically, a blower passes air through heat exchangers and delivers conditioned air to various points within the passenger cabin. Warm air may be provided by a heater core obtaining heat from coolant flowing in a combustion engine, for example. Cool air may be obtained using a compressor mechanically-driven by the engine. Electrified vehicles such as hybrid electric vehicles (HEVs) and battery electric vehicles (BEVs) may instead use electrically powered devices such as PTC resistance heaters and electric air conditioning compressors.

The simplest climate control systems in motor vehicles provide the occupant with direct control of the intensity of heating or cooling, the operating speed of the blower, and the relative amount of air flow going to different registers. This requires the user to continually monitor and adjust the climate control settings in order to remain comfortable. The vehicle occupants, however, may not understand how to best control the HVAC system to optimize efficiency. They may turn the control knobs to a maximum output while aiming the blower vanes upward or downward away from their bodies, sending the conditioned air tumbling onto less important surfaces and requiring more energy to make the occupants comfortable. This also results in greater blower fan noise than is really necessary to achieve the desired thermal comfort.

Electronic automatic temperature control (EATC) systems have also been introduced wherein a feedback control system monitors ambient air temperature within the passenger compartment and automatically adjusts blower speed and heater core or air conditioning operation to maintain a desired temperature setting. In some vehicles, multiple zones have been implemented with separate automatic temperature control with individual target temperature settings being made for each zone.

Traditional HVAC systems only indirectly control the actual skin temperature of an occupant. Because skin temperature is a better indicator of actual occupant comfort, systems have been investigated for regulating HVAC system operation using infrared (IR) sensors to determine the skin temperature of the vehicle occupants and then adjusting a temperature setpoint of the HVAC system in the direction required to achieve a target skin temperature. However, the thermodynamic environment in a vehicle interior is complex, as are the relationships between various HVAC control settings and the resulting effect on skin temperature of different occupants. Therefore, previous systems have been relatively complex and not cost effective.

In order to reduce energy consumption and to provide optimal comfort, various systems have also been proposed which automatically adjust the pattern of air flow delivered into the passenger compartment based upon seat occupancy (e.g., turning off vents where a seat is unoccupied). However, no known system has provided sufficient accuracy or performance to truly optimize directional adjustment of treated air over a sufficiently wide range of thermal conditions.

SUMMARY OF THE INVENTION

The present invention uses thermographic image processing to identify occupants' skin surfaces which can be targeted with a treated air stream using electronically-controlled vents which have two-axis directional control, and optionally have a nozzle control for focusing the air stream. Based on detected seat occupancy, airflow from multiple vents may be targeted at detected skin targets according to which seats are occupied. Thermographic images can be taken successively in order to update air stream direction and flow rate under changing conditions.

In one aspect of the invention, a vehicle apparatus includes a heating, ventilating, and air conditioning (HVAC) system having a steerable outlet for directing a stream of treated air into a passenger compartment of a vehicle. A thermographic imager is configured to capture thermographic images covering a fixed region within the passenger compartment in which an occupant is potentially located. The HVAC control circuit is configured to a) compress a thermographic image to a temperature map representing pixels of the thermographic image falling within a predetermined temperature range corresponding to the occupant, b) filter the temperature map according to a sliding window to coalesce continuous regions of pixels on average falling within the predetermined temperature range, c) quantify an area for each continuous region, d) locate a centroid of a continuous region having a largest area, and e) aim the steerable outlet toward the centroid.

BRIEF DESCRIPTION OF THE DRAWINGS

FIGS. 3 and 4 are side views of steerable air outlets.

FIG. 5 shows a sequence of image data used in a preferred embodiment for aiming a steerable air outlet toward an occupant.

FIG. 10 shows an array of pixels for a portion of a thermographic image after conversion to a bi-valued temperature map.

FIGS. 11 and 12 illustrate a sliding window at successive positions during filtering of a temperature map to coalesce regions within the bi-valued temperature map.

FIG. 13 illustrates an array of pixels after coalescing the regions.

DETAILED DESCRIPTION OF PREFERRED EMBODIMENTS

Figure 1:
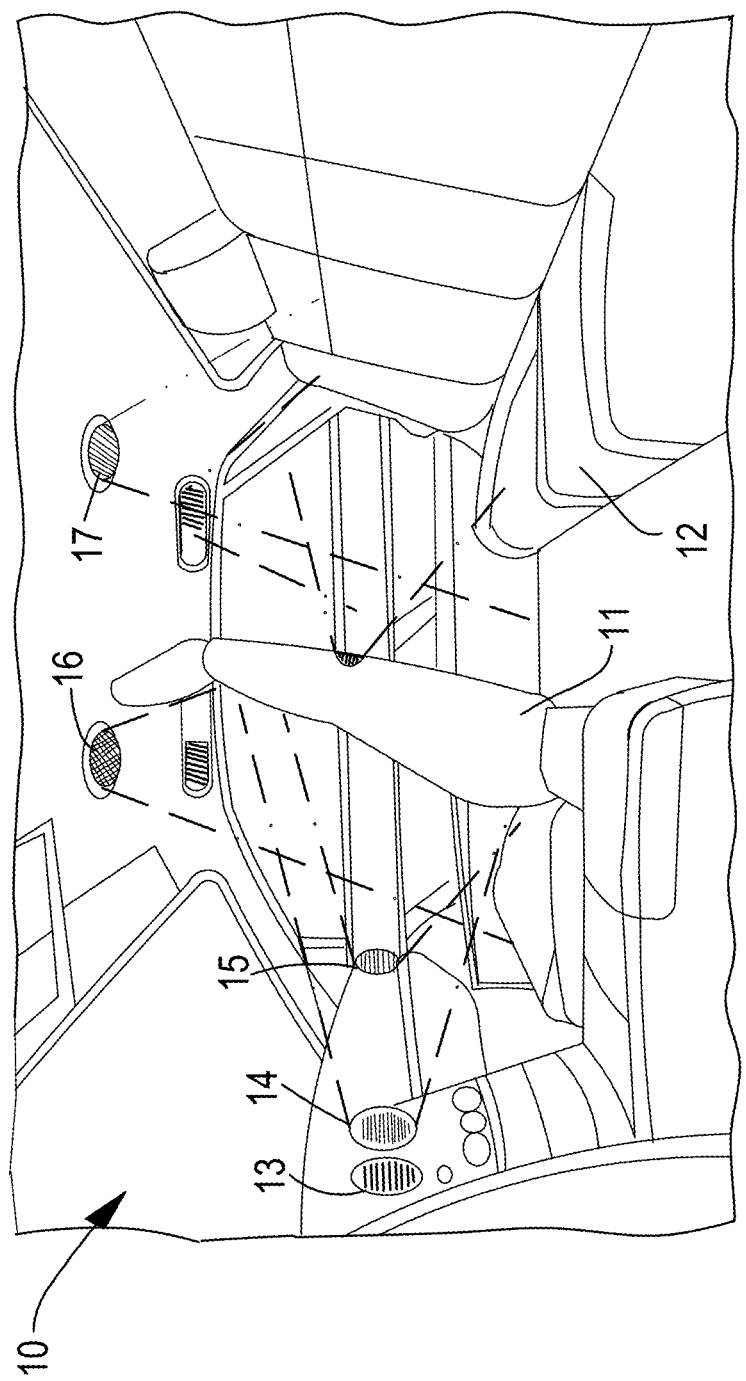
FIG. 1 is a perspective view of an automotive passenger compartment including an HVAC system with multiple, steerable air outlets or vents for providing climate control for occupants of the vehicle.

FIG. 1 shows a passenger compartment 10 of an automotive vehicle with various seating locations such as a front seat 11 and rear seats 12. A vehicle HVAC system includes a plurality of air outlets or vents 13-17 for directing respective streams of treated air into passenger compartment 10. One or more of vents 13-17 has a steerable outlet so that the direction and/or focus (i.e., spread) are automatically adjustable by the HVAC system.

Figure 2:
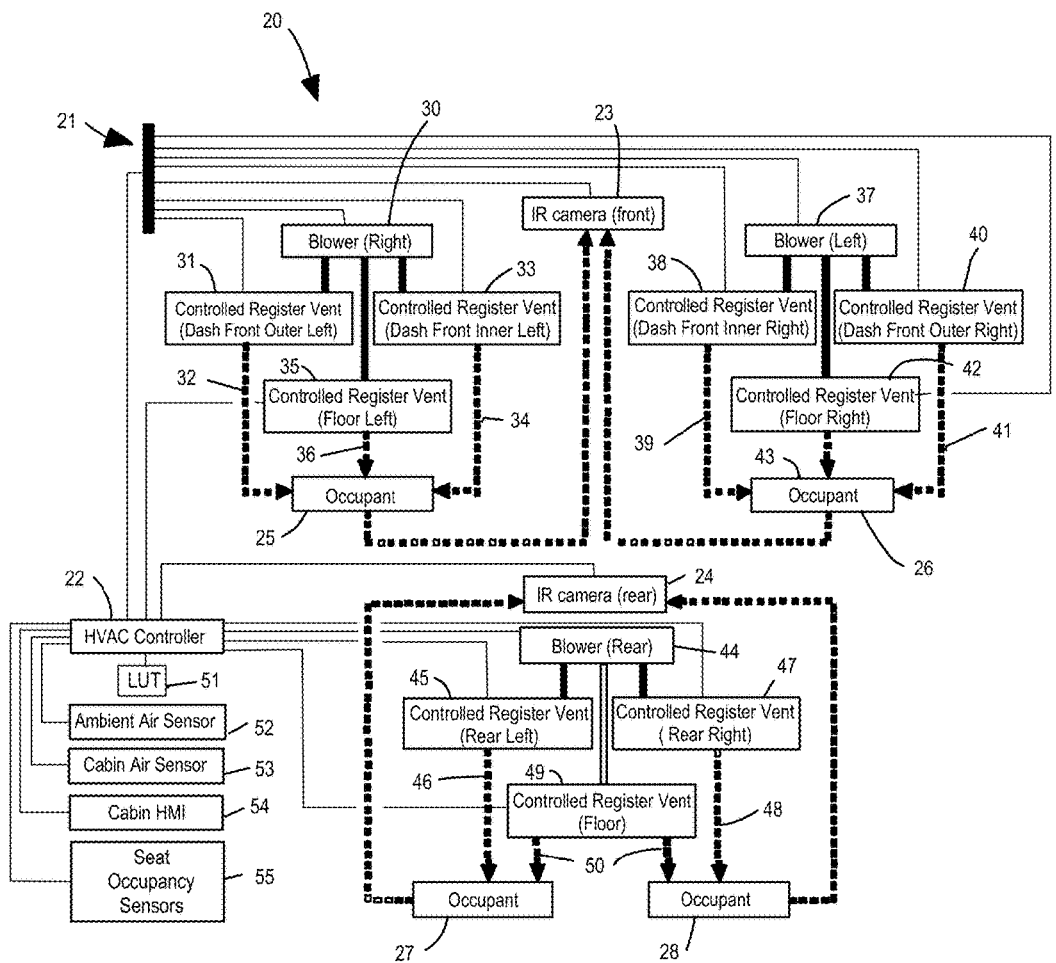
FIG. 2 is a block diagram showing one preferred embodiment of a vehicle apparatus of the invention.

FIG. 2 shows an HVAC system 20 with various components interconnected by an electrical system 21 preferably including an electrical wiring harness and a multiplex communication system as commonly used in the industry. An HVAC control circuit 22 may preferably be comprised of a typical electronic module including customized circuits and/or one or more programmable microcontrollers with appropriate software and/or firmware as commonly deployed in automotive vehicles.

A thermographic imager, preferably taking the form of an infrared camera 23, is disposed at a forward location in the passenger compartment in order to capture thermographic images covering a fixed region in and around front seating areas 25 and 26. Occupant seating area 26 may be provided for a driver, for example. HVAC controller may be configured to always assume that a driver is present. On the other hand, occupant seating 25 may represent a passenger seat in which an occupant is potentially located but may also be unoccupied. Another infrared camera 24 may be disposed in a rearward location in order to capture thermographic images covering a rear seat area in the passenger compartment including occupant areas 27 and 28.

In the front seat area, blowers 30 and 37 for right and left sides of the passenger compartment may be provided which are separately controllable with a variable speed determined by HVAC controller 22. Blower 30 provides a stream of treated air to controlled register vents 31, 33, and 35. Vent 31 is dash-mounted on a left, outer side of the dashboard near occupant seat 25 for providing an air stream 32. Vent 33 is dash-mounted at a left, inside location to supplying an airstream 34, and vent 35 is a left floor vent for providing an airstream 36. At least one of vents 31, 33, and 35 is automatically steerable to direct an airstream at a desired target within occupant area 25. Similarly, variable-speed blower 37 is coupled to dash-mounted front, inner, right vent 38 supplying an airstream 39, front, outer, right vent 40 supplying airstream 41, and right floor vent 42 supplying airstream 43 to occupant area 26. In the present invention, any combination of steerable and fixed vents can be employed. Moreover, a particular controlled vent can also be configured to direct an air stream alternately at different ones of the occupant areas.

A blower 44 also controlled by HVAC controller 22 supplies treated air streams to rear vents 45, 47, and 49 directing airstreams 46, 48, and 50 to occupant areas 27 and 28 as shown.

HVAC controller 22 is connected to or may include a lookup table 51 for purposes described in detail below. In addition, HVAC controller 22 is connected to various sensors including an ambient outside air temperature sensor 52, a cabin internal air temperature sensor 53, and seat occupancy sensors 55. HVAC controller 22 is connected to a cabin-mounted human machine interface (HMI) 54 as known in the art. The controlled vents include actuators that are activated by HVAC controller 22 based on signals from HMI 54, sensors 52, 53, and 55, and IR cameras 23 and/or 24 in order to direct treated air to obtain passenger comfort at an optimized energy usage.

FIG. 3 shows one example of a steerable air outlet vent 60 installed in an instrument panel or dashboard 61. An air duct 62 receiving treated air from a blower supplies the air to a movable outer vent shell 63 retained upon a cup-shaped base 64. A gimbal mounting 65 that can be rotated along one or more axes by a motor 66 under control of the HVAC controller is connected to shell 63. By manipulating gimbal mount 65, an air stream exits an opening in shell 63 to move in a desired direction. Internal flaps or gates, such as a flap 67, may be disposed within shell 63 and coupled with an actuator motor 68 in order to shape (i.e., throttle) the edges of an exiting air stream in order to provide a desired focus of the outlet airstream.

FIG. 4 shows an alternative embodiment for steering an outlet airstream with a vent having controllable vanes 70 and 71. Although two vanes are shown, a greater number of vanes would normally be employed. Each vane 70 and 71 has end pivot points 72 rotatably mounted to a vent housing (not shown). The vanes are all interconnected by a linking rod 73 to maintain a parallel spacing. The up and down motion of rod 73 rotates vanes 70 and 71 in concert in order to direct an outlet air stream along a controllable direction. Rod 73 may be connected to an actuator motor (not shown) which is driven by the HVAC controller.

FIG. 5 depicts an overall process of the present invention for using a thermographic image to identify a target location for aiming an outlet air stream. A thermographic image 75 is captured according to a fixed field of view using an infrared camera to return to multi-valued image with pixels having a color or intensity representing respective temperature values. Based on a predetermined temperature range selected to include an expected temperature of exposed skin taking into consideration the ambient temperature conditions, the multi-valued thermographic image is compressed to a bi-valued image 76 such that pixels falling within the predetermined range are colored white and all other pixels are colored black, for example. Thus, image 76 comprises a temperature map in which regions of white pixels correspond to exposed areas of skin of a vehicle occupant. In the example shown, a head region 81 and arm/hands regions 82 and 83 are discernible in temperature map 76. However, imaging noise causes regions 81 to 83 to contain scattered black pixels making the region harder to detect automatically by the controller.

Image 77 comprises a further processed image in which regions of the pixels falling within the predetermined temperature range have been coalesced so that the regions become substantially continuous with well defined borders and no scattering of black pixels within the regions. As described below, coalescing may be performed by filtering using a sliding window to successively re-assign each pixel value to match a majority of the respective surrounding pixels.

Since the number of identified regions may exceed the number of steerable air outlets, the detected regions may be ranked according to size to allow the largest to be selected for targeting as shown in image 78. In an image 79, a centroid 88 of each selected continuous region is located in order to provide a precise target for steering the corresponding air outlet.

Figure 6:
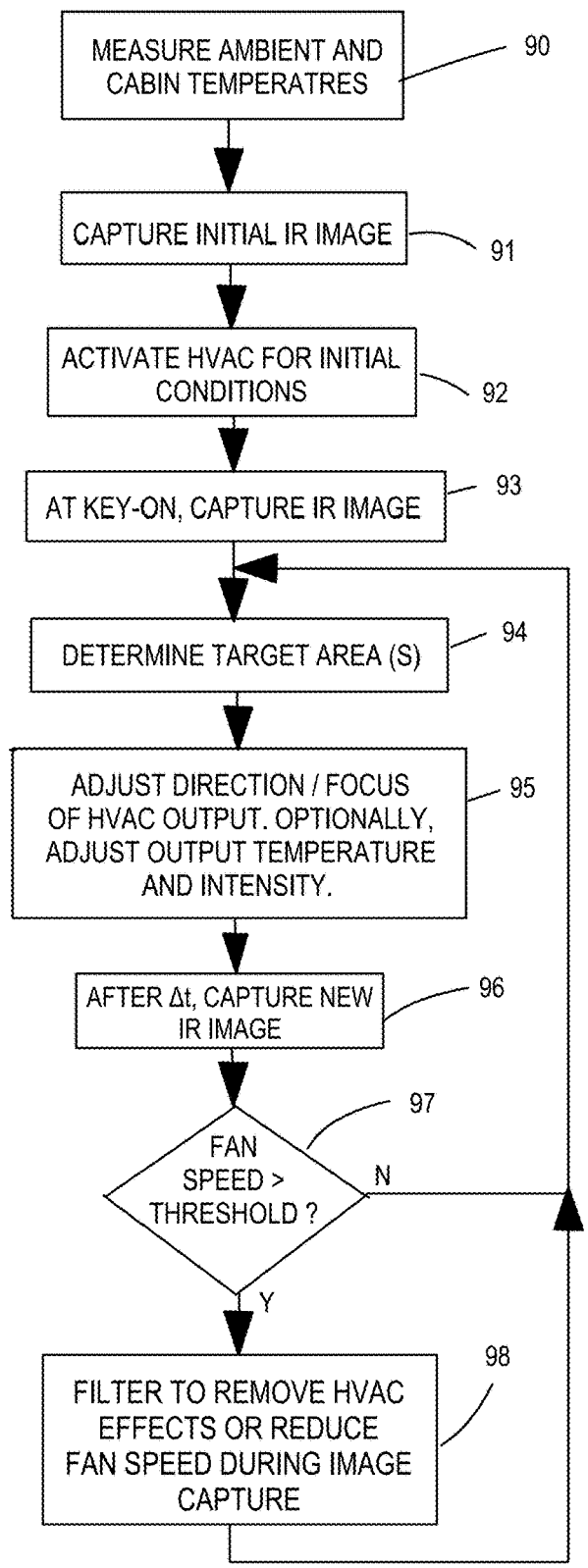
FIG. 6 is a flowchart of one preferred embodiment of a method for aiming a steerable air outlet.

A preferred method of the invention is shown in FIG. 6 wherein outside ambient temperature and internal cabin temperature are measured in step 90. Preferably, performance of the method may be initiated by unlocking or opening a door to indicate that a driving cycle of the vehicle is about to begin. In step 91, an initial thermographic image is captured, e.g., prior to any occupant being seated inside the passenger cabin. The initial image allows any particularly prominent infrared "hotspots" to be recorded and identified. In step 92, the HVAC system is activated in response to initial conditions as identified by the temperature measurements from step 90 and the initial IR image from step 91. In addition, the initial activation of the HVAC system may be based on historical HVAC settings for a temperature setpoint and blower speed that were set by the driver for similar conditions on previous trips, or according to default control values designed by the manufacturer. The time for activating the HVAC may be determined in the conventional manner, such as when a vehicle engine is remotely started via a wireless controller or when the driver enters the vehicle and starts the engine or other power plant using an ignition key, for example.

In response to a key-on, a thermographic image is captured in step 93 with the driver seating in the corresponding position. The image in step 93 may potentially contain additional occupants who will be present for the impending drive cycle. Using the captured thermographic image, target areas are determined in step 94. The direction and/or focus of various HVAC air stream outlets are adjusted in step 95. Optionally, the outlet temperature of the HVAC system and the blower speed or intensity may also be adjusted. After a predetermined period of time Δt, a new thermographic image may be captured in step 96. Since the HVAC system is actively affecting the temperature environment when subsequent thermographic images are captured, the desired skin features may be masked in the image by the appearance of the air stream. This effect is especially present when the blower is operating at higher speeds. In order to reduce the presence of a temperature signature of the treated air in the image, a check is performed in step 97 to determine whether the blower fan speed is above a threshold. If not, then target areas are determined in the subsequent image in step 94 and then the HVAC outputs are adjusted in step 95. If the fan speed is above the threshold, then the subsequent thermographic image can be filtered in step 98 to remove the effects of the treated air flow in the image. Filtering can be performed based on the turbulent nature of an airflow as seen in a typical thermographic image (e.g., image regions with a certain texture can be deleted from the image). Alternatively, the fan speed can be temporarily reduced or turned off completely during the capturing of the thermographic image.

Figure 7:
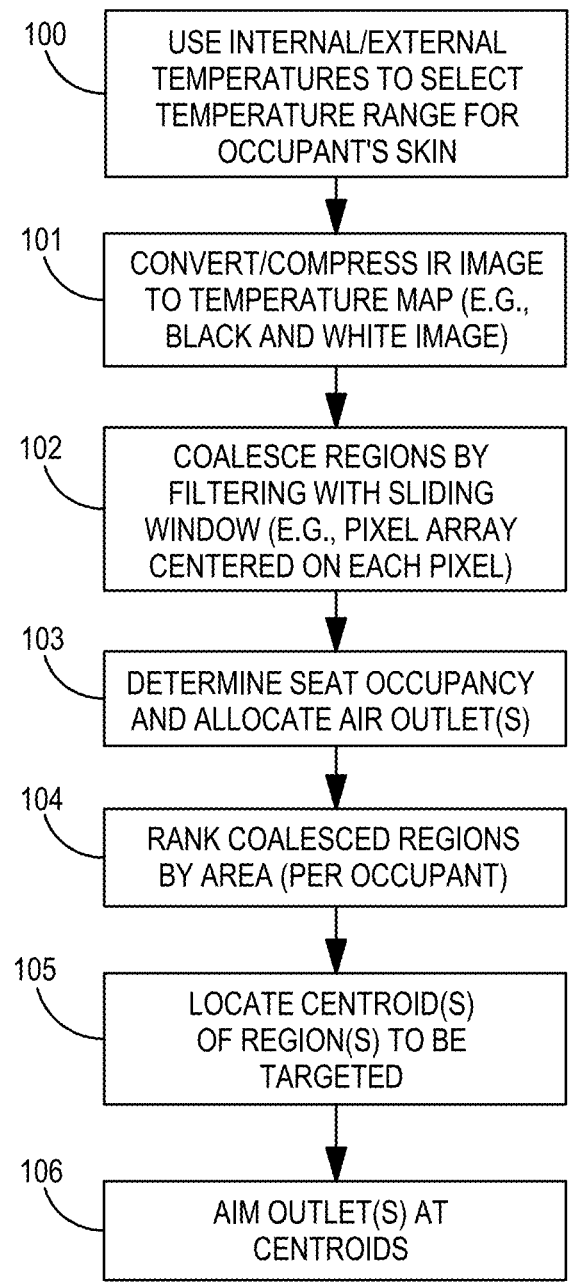
FIG. 7 is a flowchart of one preferred embodiment for determining target areas.

FIG. 7 shows a preferred method for determining target areas in greater detail. In step 100, the measured internal and external ambient temperatures are used to select the predetermined temperature range for identifying regions in the image showing an occupant's skin. The external temperature indicates whether the occupant's skin is being raised or lowered from a normal body temperature by external conditions. The internal cabin temperature helps identify the expected temperatures of interior surfaces within the vehicle (e.g., headrests). The predetermined temperature range is determined empirically in order to include expected skin temperatures while excluding as many of the interior vehicle surfaces as possible. Preferably, values for the predetermined ranges are stored in a lookup table within or accessible to the HVAC control circuit.

Figure 8:
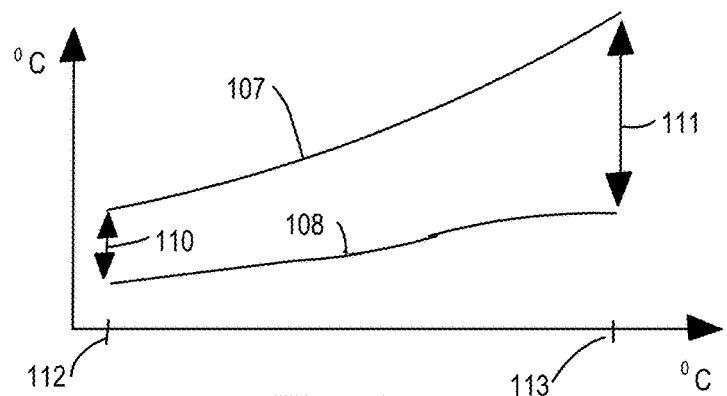
FIGS. 8 and 9 are representative plots showing predetermined temperature ranges for identifying an occupant in a thermographic image.

The lookup may be organized according to index values for the internal and external temperatures. FIG. 8 shows one example for specifying a temperature range corresponding to one particular external temperature and showing the changing range for varying internal temperature. The predetermined range has a maximum value defined by a curve 107 and a minimum value defined by a curve 108. For an internal temperature 112 at the low end of curves 107 and 108, a predetermined range 110 is defined by the respective values of curves 17 and 108. For other values of internal temperature (at the same external temperature), a different predetermined range may be obtained such as range 111 at a higher internal temperature indicated at 113. FIG. 8 is representative of curves that are obtained for high external ambient temperatures (i.e., in situations calling for HVAC cooling). During hot external conditions, the interior of the vehicle is typically heated significantly, thereby making it easier to distinguish skin temperatures. Therefore, the predetermined range may be wider at range 111 than at range 110. At more moderate temperatures, it may be more difficult to distinguish skin temperature from body structures, therefore requiring a narrower range at 110.

Figure 9:
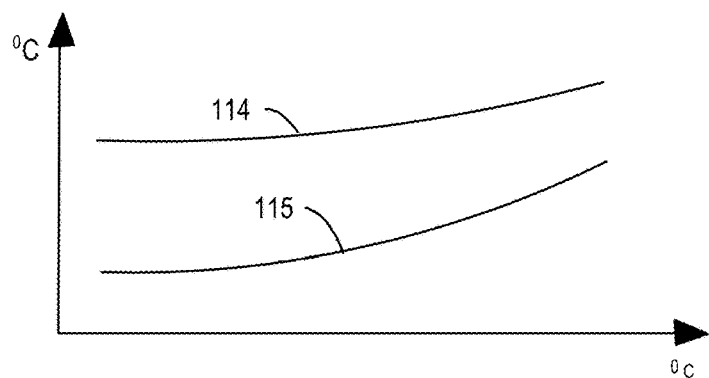

FIG. 9 is representative of colder external temperatures (i.e., a situation calling for heating of the passenger compartment) with curves 114 and 115 defining the maximum and minimum temperatures of the predetermined temperature range, respectively. Once again, at more extreme (colder) temperatures it may be easier to distinguish the occupant's skin in the image, so a wider predetermined range is specified. At more moderate temperatures it again becomes harder to distinguish the occupants skin and the predetermined range is narrower.

Returning to FIG. 7, using the predetermined range the thermographic image is compressed (i.e., converted) to a temperature map which assigns a first pixel value (e.g., a binary "1" for white) to each pixel falling within the predetermined temperature range and assigning a second pixel value (e.g., a binary "0" for black) if it corresponds to a temperature outside the predetermined range. A portion of the bi-valued temperature map is shown in FIG. 10. Shaded squares 120 correspond to black pixels in the temperature map outside the predetermined temperature range and unshaded squares 121 correspond to white pixels in the thermographic image falling within the predetermined range which indicate a potential target.

The following code written for Matlab demonstrates the compression of a thermograph image into a black and white temperature map and displaying the resulting image.

```
%Find target areas:
tol = 90;
div = 30;
r=252;
g=243;
b=102;
img2a = img(:,:,1);
img2b = img(:,:,2);
img2c = img(:,:,3);
idx1 = find(img2a>max(0,r-tol) & img2a<min(255,r+tol));
idx2 = find(img2b>max(0,g-tol) & img2b<min(255,g+tol));
idx3 = find(img2c>max(0,b-tol) & img2c<min(255,b+tol));
idx = intersect(idx1,intersect(idx2,idx3));
img2a = zeros(size(img2a));
img2b = zeros(size(img2b));
img2c = zeros(size(img2c));
```

```
    img2a(idx) = 255;
    img2b(idx) = 255;
    img2c(idx) = 255;
    img2 = (img2a*0.2989 + img2b*0.5870 + img2c*0.1140);
    ax(2)=subplot(1,5,2);
    imshow(img2/255)
    %------------
```

In step 102 of FIG. 7, potential target regions are coalesced by filtering with a sliding window. As shown in FIG. 11, the sliding window is preferably comprised of a pixel array 122 centered on a pixel 123. During the filtering process, window 122 is scanned over the thermographic image at each potential center pixel, with the value for each center pixel being reassigned a new value in a coalesced image such that its new value matches a majority value for the pixels of the temperature map within the sliding window at that position. At the position shown in FIG. 11, for example, center pixel 123 would be assigned a binary value of 0 since most pixels within window 122 are black. Stated in an equivalent manner, the average value for all the pixels within window 122 is determined (e.g., counting the white pixels and dividing by the number of pixels covered by the window), with the resulting average being rounded to 0 or 1 to determine the value to be assigned to center pixel 123. FIG. 13 shows the coalesced image, with pixel 123 remaining black.

FIG. 12 shows a subsequent position for sliding window 122 centered on the next pixel 124 in the same row. Since the majority of pixels bounded by this new position of sliding window 122 are black, pixel 124 remains black in the coalesced image of FIG. 13. When sliding window 122 moves to the next position in the same role, a pixel 125 is evaluated, and in the example shown the majority value continues to be black. Therefore, pixel 125 switches to a value of 0 (i.e., white) in FIG. 13. Thus, the filtering results in some minor adjustment of the actual borders of a potential target region. On the other hand, when it comes to isolated black pixels within a target region such as pixels 126 and 127, the filtering by sliding window 122 reassigns them to a value of 1 based upon the majority of pixels in the temperature map around them being white. Thus, FIG. 13 shows a coalesced image in which a more continuous target region based on the use of a sliding window to set all pixels to white whenever the value of the pixels within the window fall on average within the predetermined temperature range.

The following Matlab code continues the example to demonstrate the sliding window filtering to coalesce the target regions.

```
    %Coalesce patches to simplify:
    sq=20; %pad img2 w/ zeros around border
    img3=img2;
    img3=[zeros(sq,size(img3,2)); img3; zeros(sq,size(img3,2))];
    img3=[zeros(size(img3,1),sq) img3 zeros(size(img3,1),sq)];
    for i = sq+1 : size(img3,1)-sq
      for j = sq+1 : size(img3,2)-sq
        img3(i,j) = mean(mean(img3(i-sq:i+sq,j-sq:j+sq)));
    %   img3(i,j) = 200;
      end
      disp(i)
    end
    img3 = img3(sq:end-sq-1,sq:end-sq-1); %remove padding
    img3(img3>100)=255;
    img3(img3<=100)=0;
```

```
    ax(3)=subplot(1,5,3);
    imshow(img3/255)
    %------------
```

The sliding window is comprised of a square array of pixels having a size adapted to provide the best performance for removing extraneous noise while preserving the borders of target regions. An array size of 20×20 pixels has been found to be effective. Since the sliding window cannot be centered on a range of pixels along the outer edges of the thermographic image, the corresponding pixels may be disregarded in forming the temperature map (or extra pixels with a zero value can be appended around the original image to facilitate placement of the sliding window.

Returning to FIG. 7, an optional determination of seat occupancy is made in step 103 in the event that there are air outlets capable of being allocated between different seating locations and depending upon the presence or absence of occupants in the corresponding locations. Step 103 can be skipped if the steerable outlet(s) are only capable of being aimed at one particular seat location. The determination of seat occupancy can assist in determining how many air outlets will be aimed at each particular seating location, but such determination can alternatively be a fixed relationship or may be determined by other measures, such as by manual configuration using the HVAC HMI.

In step 104, coalesced regions are ranked by area. If there is only one steerable air outlet then the ranking merely needs to identify the largest coalesced region. Where there are multiple steerable outlets that are going to be used to provide airflow to a particular occupant, then the ranking identifies the corresponding number of the largest coalesced regions in order to assign each respective steerable outlet to a selected area. For example, in a vehicle with two steerable air outlets for serving the front seat passengers and with only two front seating positions (i.e., driver and passenger), then if no passenger is present the two largest coalesced regions in the driver's seating location would be identified and targeted. On the other hand, if a passenger is present then the largest coalesced region for each of the seating locations are identified and the respective steerable outlets are aimed accordingly.

Ranking the regions by area involves summing the number of white pixels in the region. The Matlab demonstration uses a function called bwboundary in summing the areas as follows.

```
    %Rank area by size:
    [B,L] = bwboundaries(img3,'noholes');
    for k = 1:length(B)
      area(k,1) = polyarea(B{k}(:,1),B{k}(:,2));
    end
    area_sort = flipud(sortrows([area [1:length(B)]'],1));
    ax(4)=subplot(1,5,4);
    which_areas = [1 ]; %specify ranks 1-to-N to target
    for i=which_areas
      L_temp = L;
      L_temp(L_temp~=int16(area_sort(i,2))) = 0;
      L_ranked(:,:,i) = L_temp;
    end
    img4 = label2rgb(sum(L_ranked,3), @spring, [0.0 0.0 0.0]);
    imshow(img4)
    %------------
```

Figure 14:
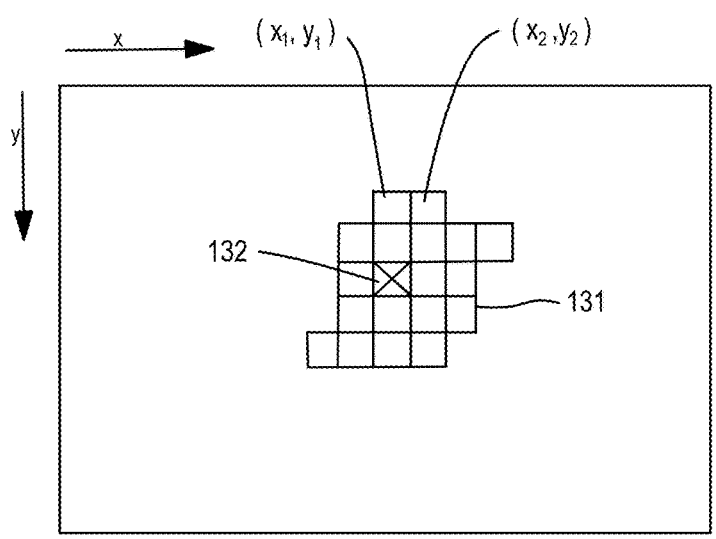
FIG. 14 illustrates one preferred technique for locating a centroid within a coalesced region.

In step 105, the centroids for the largest ranked region(s) to be targeted are determined. Then the outlets are aimed at the centroids in step 106. A preferred method for locating centroids is illustrated in FIG. 14. In a coalesced image 130, a coalesced region 131 has been ranked and identified as a target area (i.e., it corresponds to the occupant's skin surface). A centroid 132 of region 131 may preferably be determined by calculating an average of the orthogonal coordinates of the pixels within the region 131. Thus, orthogonal coordinates x and y correspond to the columns and rows of image 130. The coordinates for two of the included pixels are shown as $(x_1,y_1)$ and $(x_2,y_2)$. The x and y values for all the pixels within region 131 are averaged in order to determine the average coordinate for centroid 132 (with the average value being rounded off).

Continuing the Matlab example, locating the centroid is demonstrated as follows.

```
%Find centroids of target area(s):
for i=which_areas
    [row,col] = find(L_ranked(:,:,i)>0);
    L_ranked_cent(i,:) = [round(mean(col)) round(mean(row))];
end
ax(5)=subplot(1,5,5);
imshow(img4)
hold on
plot(L_ranked_cent(:,1),L_ranked_cent(:,2),'w.','markersize',40)
plot(L_ranked_cent(:,1),L_ranked_cent(:,2),'r.','markersize',35)
plot(L_ranked_cent(:,1),L_ranked_cent(:,2),'w+','markersize',10)
linkaxes(ax,'x')
% hold on
% for k = 1:length(B)
%   boundary = B{k};
%   plot(boundary(:,2), boundary(:,1), 'w', 'LineWidth', 2)
% end
```

What is claimed is:

1. Apparatus comprising:
   a steerable outlet delivering temperature-treated air in a passenger compartment;
   a thermographic imager capturing thermographic images of the passenger compartment; and
   a controller compressing a thermographic image to a temperature map representing pixels falling within predetermined temperature ranges, filtering the map according to a sliding window to coalesce continuous pixel regions, quantifying an area for each continuous region, and steering the outlet toward a centroid of the continuous region having a largest area.

2. The apparatus of claim 1 wherein the thermographic imager is configured to capture thermographic images covering a fixed region within the passenger compartment in which an occupant is potentially located.

3. The apparatus of claim 1 wherein the steerable outlet has a variable focus controllable by the controller in response to a magnitude of the largest area.

4. The apparatus of claim 1 further comprising:
   an ambient temperature sensor measuring an external temperature outside the passenger compartment; and
   a cabin temperature sensor measuring an internal temperature inside the passenger compartment;
   wherein the controller selects the predetermined temperature range in response to the external and internal temperatures.

5. The apparatus of claim 4 wherein the steerable outlet has a variable flow rate controllable by the controller in response to the internal temperature.

6. The apparatus of claim 1 wherein the centroid of the continuous region is located in response to an average of orthogonal coordinates of the pixels of the region.

* * * * *